US012605634B2

(12) United States Patent
Zhang

(10) Patent No.: US 12,605,634 B2
(45) Date of Patent: Apr. 21, 2026

(54) METHOD, APPARATUS, ELECTRONIC DEVICE AND STORAGE MEDIA FOR SKILL CONTROL OF VIRTUAL OBJECT

(71) Applicant: Beijing Zitiao Network Technology Co., Ltd., Beijing (CN)

(72) Inventor: Yichi Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 243 days.

(21) Appl. No.: 18/462,356

(22) Filed: Sep. 6, 2023

(65) Prior Publication Data

US 2024/0075388 A1    Mar. 7, 2024

(30) Foreign Application Priority Data

Sep. 7, 2022    (CN) .......................... 202211090365.9

(51) Int. Cl.
    *A63F 13/58*        (2014.01)
    *A63F 13/67*        (2014.01)
    (Continued)

(52) U.S. Cl.
    CPC .............. *A63F 13/58* (2014.09); *A63F 13/67* (2014.09); *A63F 13/798* (2014.09); *G06T 17/00* (2013.01)

(58) Field of Classification Search
    CPC .......... A63F 13/25; A63F 13/40; A63F 13/44; A63F 13/45; A63F 13/46; A63F 13/50;
    (Continued)

(56) References Cited

U.S. PATENT DOCUMENTS 12,274,943 B2 * 4/2025 Lin .......................... A63F 13/52
2002/0103031 A1 8/2002 Neveu et al.
(Continued)

FOREIGN PATENT DOCUMENTS

CN      111481932 A    8/2020
CN      111905363 A   11/2020
(Continued)

OTHER PUBLICATIONS

China National Intellectual Property Administration, Office Action Issued in Application No. 202211090365.9, Apr. 18, 2025, 24 pages.
(Continued)

*Primary Examiner* — Omkar A Deodhar
(74) *Attorney, Agent, or Firm* — Alleman Hall LLP

(57) ABSTRACT

A method for skill control of a virtual object comprises: displaying a virtual object and its corresponding base attack controls and a plurality of skill controls; the plurality of skill controls corresponding to skill attributes of N types where N is a positive integer greater than or equal to 2; in response to a trigger operation for the target skill control, determining a target skill attribute corresponding to the target skill control and generating a target identification corresponding to the target skill attribute in the target area; in response to the target identification corresponding to the skill attribute of N types satisfying different predefined conditions, replacing an base attack corresponding to the base attack control with the target skill corresponding to different predefined conditions; in response to a trigger operation for the base attack control, controlling the virtual object to release the target skill.

10 Claims, 5 Drawing Sheets

100

(51) Int. Cl.
   *A63F 13/798* (2014.01)
   *G06T 17/00* (2006.01)
(58) Field of Classification Search
   CPC ...... A63F 13/5375; A63F 13/55; A63F 13/56;
        A63F 13/58; A63F 2300/60; A63F
        2300/61; A63F 2300/63; A63F 2300/65
   See application file for complete search history.

(56)                      References Cited

U.S. PATENT DOCUMENTS

2014/0329602 A1* 11/2014 Hisaoka ................. A63F 13/44
                                                      463/42
2022/0047941 A1*  2/2022 Chen .................... A63F 13/837

FOREIGN PATENT DOCUMENTS

| CN | 112870688 A | 6/2021 |
|---|---|---|
| CN | 113633978 A | 11/2021 |

OTHER PUBLICATIONS

"The awakening technique of the second normal attack in Diablo Immortal and the comparison between the two normal attacks," Bilibili, Available Online at https://www.bilibili.com/video/BV1EA411374v/, May 25, 2021, 3 pages.

* cited by examiner

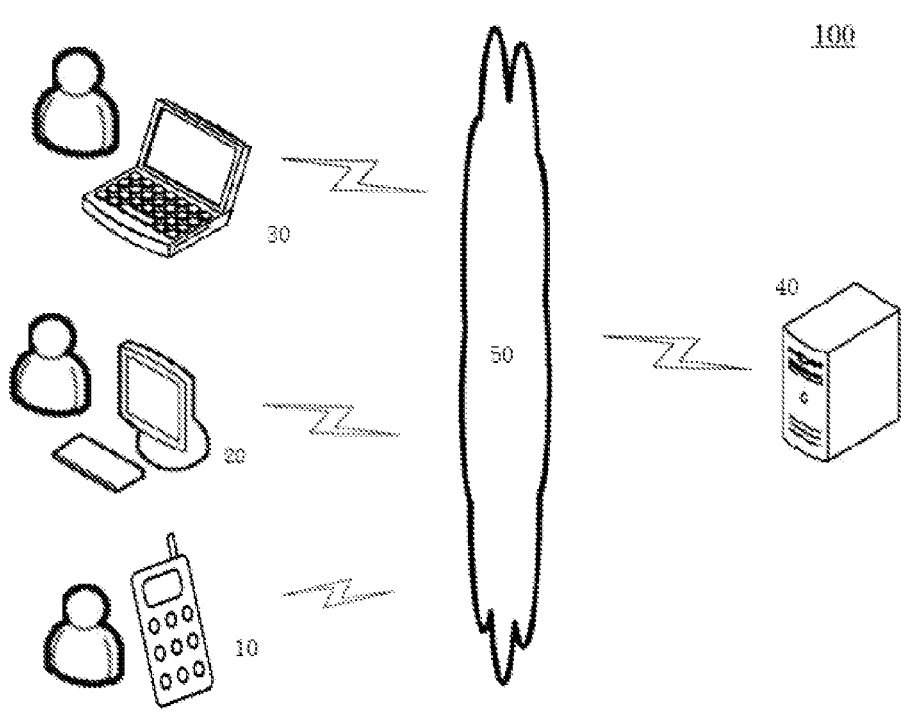

FIG. 1

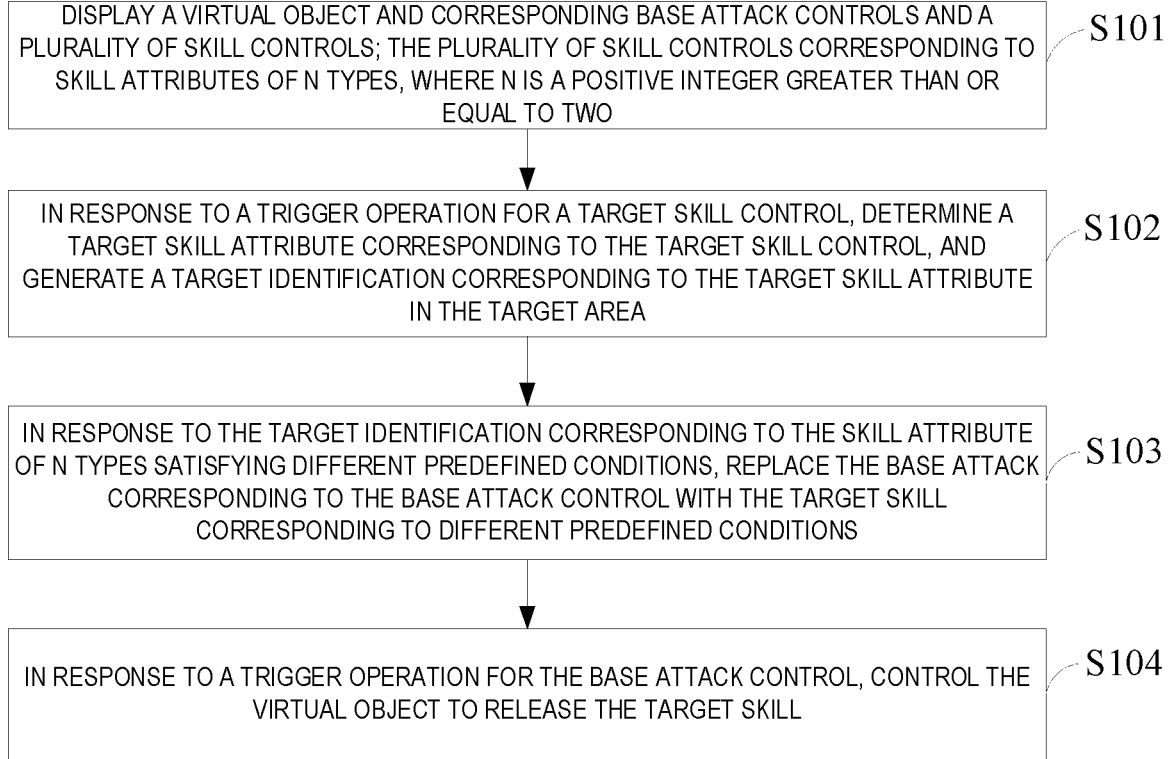

DISPLAY A VIRTUAL OBJECT AND CORRESPONDING BASE ATTACK CONTROLS AND A PLURALITY OF SKILL CONTROLS; THE PLURALITY OF SKILL CONTROLS CORRESPONDING TO SKILL ATTRIBUTES OF N TYPES, WHERE N IS A POSITIVE INTEGER GREATER THAN OR EQUAL TO TWO    S101

IN RESPONSE TO A TRIGGER OPERATION FOR A TARGET SKILL CONTROL, DETERMINE A TARGET SKILL ATTRIBUTE CORRESPONDING TO THE TARGET SKILL CONTROL, AND GENERATE A TARGET IDENTIFICATION CORRESPONDING TO THE TARGET SKILL ATTRIBUTE IN THE TARGET AREA    S102

IN RESPONSE TO THE TARGET IDENTIFICATION CORRESPONDING TO THE SKILL ATTRIBUTE OF N TYPES SATISFYING DIFFERENT PREDEFINED CONDITIONS, REPLACE THE BASE ATTACK CORRESPONDING TO THE BASE ATTACK CONTROL WITH THE TARGET SKILL CORRESPONDING TO DIFFERENT PREDEFINED CONDITIONS    S103

IN RESPONSE TO A TRIGGER OPERATION FOR THE BASE ATTACK CONTROL, CONTROL THE VIRTUAL OBJECT TO RELEASE THE TARGET SKILL    S104

FIG. 2

METHOD, APPARATUS, ELECTRONIC DEVICE AND STORAGE MEDIA FOR SKILL CONTROL OF VIRTUAL OBJECT

FIELD

The present disclosure relates to the field of computer technology, specifically, to a method, device, electronic device, and storage medium for skill control of virtual objects.

BACKGROUND

With the rapid development of computer technology and the popularization of wireless networks, people can engage in increasingly diverse entertainment activities through electronic devices, such as playing various online games through terminal devices, such as action games, adventure games, shooting games, combat games, etc.

At present, various game interfaces usually display various skill controls. After the player's game character reaches the corresponding level or completes the corresponding task, they can obtain the corresponding skills and release them by triggering the corresponding skill controls to achieve better combat capabilities. However, although this method can achieve the acquisition and release of skills, it is relatively single and thus affects the gaming experience of players.

SUMMARY

Embodiments of the present disclosure at least provide a method, apparatus, electronic device, and storage medium for at least of virtual objects, which can enrich the conditions for skill acquisition and release, thereby enhancing the fun of the game.

Embodiments of the present disclosure provide a method for skill control of virtual objects comprising:

displaying a virtual object and corresponding base attack controls and a plurality of skill controls; the plurality of skill controls corresponding to skill attributes of N types, where N is a positive integer greater than or equal to two;

in response to a trigger operation for a target skill control, determining a target skill attribute corresponding to the target skill control and generating a target identification corresponding to the target skill attribute in the target area;

in response to the target identification corresponding to the skill attribute of N types satisfying different predefined conditions, replacing the base attack corresponding to the base attack control with the target skill corresponding to different predefined conditions;

in response to a trigger operation for the base attack control, controlling the virtual object to release the target skill.

In the embodiments of the present disclosure, during the process of releasing skills, corresponding target identifications can be generated, and when the target identifications corresponding to the skill attributes of N types meet different predefined conditions, the base attack corresponding to the base attack control can be replaced with target skills corresponding to different predefined conditions. In this way, different target skills can be obtained according to different skill attributes and number of the released skills, and the target skill can be released with base attack controls. As such, the fun of the game can be enhanced and the players may have different gaming experiences.

In a possible embodiment, the method further comprises: displaying at least one skill slot, each skill slot corresponding to at least one skill control with a same target skill attribute.

In such embodiment, skill controls with the same target skill attribute can be displayed together through a skill slot, and skill controls with various skill attributes can be classified and organized. This not only helps players distinguish skill controls with different types of skill attributes, but also improves the cleanliness and aesthetics of the display interface, which is conducive to improving the visual viewing effect of players.

In a possible embodiment, replacing the base attack corresponding to the base attack control with the target skill corresponding to different predefined conditions comprises:

replacing the base attack corresponding to the base attack control with the target skill corresponding to different predefined conditions, and changing a display style of the base attack control.

In such embodiment, while replacing the base attack corresponding to the base attack control with target skills corresponding to different predefined conditions, the display style of the base attack control is also changed. This allows players to intuitively perceive that the functions corresponding to the base attack control have changed, which is beneficial for improving their gaming experience.

In a possible embodiment, the target identification corresponding to the skill attribute of N types satisfying different predefined conditions comprises:

a target identification of each of the skill attributes of N types corresponding to a predefined condition; and/or, combining the target identifications of at least two of the skill attributes of N types to obtain combination results; wherein each of the combination results corresponds to a predefined condition.

In such embodiment, the target identification of each skill attribute in the N skill attributes can correspond to a predefined condition, or the combination of target identification of at least two skill attributes in the N skill attributes can correspond to a predefined condition. In this way, the predefined conditions can be diversified, and the target skills obtained can be diversified, which is conducive to enhancing the fun of the game.

In a possible embodiment, for each combination result, the target skills corresponding to the predefined condition corresponding to the combination result comprises the target skill corresponding to the predefined condition corresponding to the target identification of each type of skill attribute contained in the combination result, and an additional skill effect.

In such embodiment, in the case where the predefined conditions correspond to two or more types of skill attributes, the target skill is the target skill corresponding to the predefined conditions corresponding to the target identification of each type of skill attribute, and the skill effect is added. In this way, while achieving the combination of skills, the skill effect can be displayed externally, thereby improving the player's skill release experience and enhancing the player's visual experience.

In a possible embodiment, the different predefined conditions are determined by the number and/or presentation style of the target identifications of the corresponding skill attribute of at least one type.

In this embodiment, the predefined conditions can be determined based on the number of target identifications in skill attributes, the presentation style of target identifications, or a combination of the two to diversify the predefined conditions and provide players with a diverse target skill experience.

In a possible embodiment, the target area comprises a plurality of sub-areas, with each skill attribute corresponding to a sub-area; in response to a trigger operation for a target skill control, determining a target skill attribute corresponding to the target skill control and generating a target identification corresponding to the target skill attribute in the target area comprises:

in response to the trigger operation for the target skill control, determining the target skill attribute corresponding to the target skill control and the target sub-area corresponding to the skill attribute; and generating a target identification corresponding to the target skill attribute in the target sub-area.

In this embodiment, target identifications of different skill attributes correspond to different sub-areas. This allows for the generation of corresponding target identifications in the same sub-area after the release of skills of the same skill attribute, which is beneficial for players to visually distinguish different target identifications through the display area. In addition, it can also improve the aesthetics of the display interface layout.

In a possible embodiment, the respective sub-areas have predetermined positional relationship, and adjacent sub-areas are separated by a target pattern.

In the disclosed embodiment, due to the predefined positional relationship between each sub-area, the efficiency of determining each sub-area can be improved. In addition, adjacent sub-areas are separated by target patterns, which not only facilitates players to distinguish between adjacent sub-areas, but also improves the aesthetics of the display.

In a possible embodiment, upon releasing the target skill, the method further comprises restoring the target area corresponding to the target skill to an initial state.

In such embodiment, after the target skill is released, the target area corresponding to the target skill is restored to its initial state, which represents the end of a cycle of target skills and is conducive to the generation of the next target identification. This can then achieve a continuous cycle of generating and releasing target skills during the game process, which is beneficial for improving the player's gaming experience.

The present disclosed embodiment provides an apparatus for skill control of a virtual object, comprising:

display module for displaying a virtual object and corresponding base attack controls and a plurality of skill controls; the plurality of skill controls corresponding to skill attributes of N types, where N is a positive integer greater than or equal to two;

determination module for, in response to a trigger operation for a target skill control, determining a target skill attribute corresponding to the target skill control and generating a target identification corresponding to the target skill attribute in the target area;

replacement module for, in response to the target identification corresponding to the skill attribute of N types satisfying different predefined conditions, replacing the base attack corresponding to the base attack control with the target skill corresponding to different predefined conditions; and release module for, in response to a trigger operation for the base attack control, controlling the virtual object to release the target skill.

In a possible implementation, the display module is also for:

displaying at least one skill slot, each skill slot corresponding to at least one skill control with a same target skill attribute.

In a possible embodiment, the replacement module is specifically for:

replacing the base attack corresponding to the base attack control with the target skill corresponding to different predefined conditions, and changing a display style of the base attack control.

In a possible embodiment, the target identification corresponding to the skill attribute of N types satisfying different predefined conditions comprises:

a target identification of each of the skill attributes of N types corresponding to a predefined condition; and/or, combining the target identifications of at least two of the skill attributes of N types to obtain combination results; wherein each of the combination results corresponds to a predefined condition.

In a possible embodiment, for each combination result, the target skills corresponding to the predefined condition corresponding to the combination result comprises the target skill corresponding to the predefined condition corresponding to the target identification of each type of skill attribute contained in the combination result, and an additional skill effect.

In a possible embodiment, the different predefined conditions are determined by the number and/or presentation style of the target identifications of the corresponding skill attribute of at least one type.

In a possible embodiment, the target area comprises a plurality of sub-areas, with each skill attribute corresponding to a sub-area; the determination module is specifically for:

in response to the trigger operation for the target skill control, determining the target skill attribute corresponding to the target skill control and the target sub-area corresponding to the skill attribute;

generating a target identification corresponding to the target skill attribute in the target sub-area.

In a possible embodiment, the respective sub-areas have predetermined positional relationship, and adjacent sub-areas are separated by a target pattern.

In a possible embodiment, the display module is also for:

upon releasing the target skill, restoring the target area corresponding to the target skill to an initial state.

Embodiments of the present disclosure provide an electronic device comprising a processor, a memory and a bus, the memory storing machine-readable instructions which are executable by the processor, when the electronic device operating, the processor communicating with the memory through the bus, and the machine-readable instructions, when executed by the processor, carrying out the steps of the method for skill control of a virtual object as described in the above possible embodiments.

Embodiments of the present disclosure provide a computer-readable storage medium storing a computer program thereon, the computer program, when executed by a processor, carrying out the method for skill control of a virtual object as described in any of the above possible embodiments.

In order to make the above objectives, features, and advantages of this disclosure more apparent and understandable, the following text provides preferred embodiments, and in conjunction with the accompanying drawings, provides a detailed explanation as follows.

BRIEF DESCRIPTION OF THE SEVERAL VIEWS OF THE DRAWINGS

In order to provide a clearer explanation of the technical solution of the disclosed embodiments, a brief introduction will be given to the accompanying drawings required in the embodiments. The accompanying drawings are incorporated into the specification and form a part of the specification. These drawings illustrate embodiments that comply with the present disclosure and are used together with the specification to illustrate the technical solution of the present disclosure. It should be understood that the following drawings only illustrate certain embodiments of the present disclosure, and therefore should not be regarded as limiting the scope. For regular technical personnel in the art, other relevant drawings can also be obtained based on these drawings without creative labor.

FIG. 1 shows a schematic diagram of the executing entity of the skill control method of the virtual object provided in some embodiments of the present disclosure;

FIG. 2 shows a flowchart of skill control methods for virtual objects provided in some embodiments of the present disclosure;

DETAILED DESCRIPTION

Figure 3:
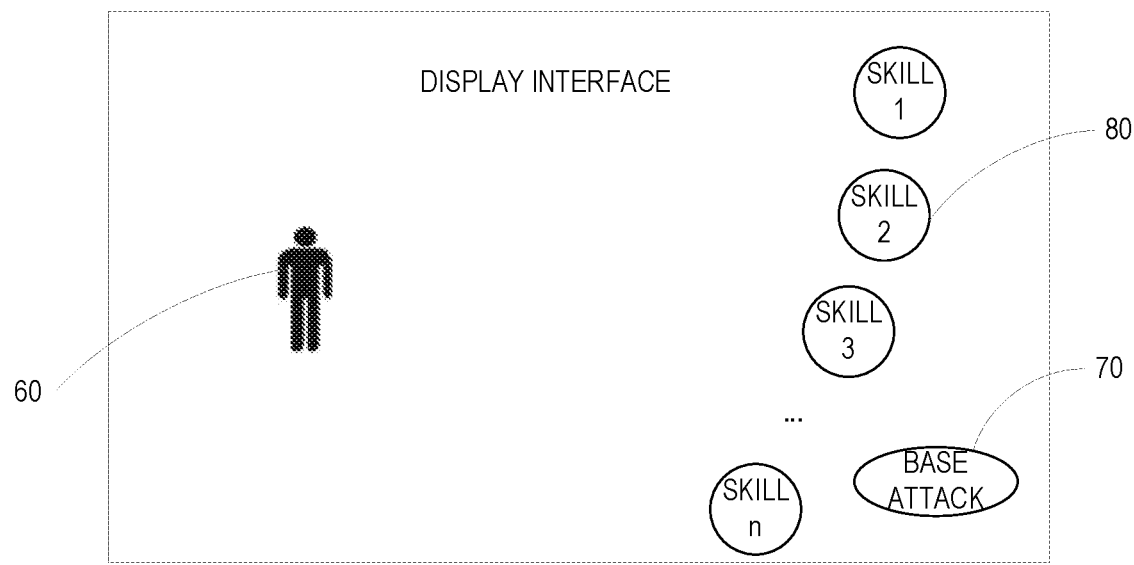
FIG. 3 shows a schematic diagram of the first display interface provided by some embodiments of the present disclosure.

In order to make the purpose, technical solution, and advantages of the disclosed embodiments clearer, the following will provide a clear and complete description of the technical solution in the disclosed embodiments in conjunction with the accompanying drawings. Apparently, the described embodiments are only some instead of all of the disclosed embodiments. The components of the present disclosed embodiment, typically described and shown in the accompanying drawings, can be arranged and designed in various different configurations. Therefore, the detailed description of the embodiments of the present disclosure provided in the accompanying drawings is not intended to limit the scope of the claimed protection, but only to represent the selected embodiments of the present disclosure. Based on the disclosed embodiments, all other embodiments obtained by those skilled in the art without creative labor fall within the scope of protection of this disclosure.

It should be noted that similar labels and letters represent similar terms in the following figures, so once an item is defined in a figure, further definition and explanation are not required in subsequent figures.

The term "and/or" in this article only describes an association relationship, indicating that there can be three types of relationships, such as A and/or B, which can represent the three situations of A alone, A and B simultaneously, and B alone. In addition, the term "at least one" in this article refers to any one or any combination of at least two of a variety, for example, comprising at least one of A, B, and C, which can represent any one or more elements selected from a set composed of A, B, and C.

With the rapid development of computer technology and the popularization of wireless networks, people can engage in increasingly diverse entertainment activities through electronic devices, such as playing various online games through terminal devices (such as mobile phones and laptops). Among them, online games are a form of entertainment that uses the internet as a medium to exchange information between clients and backend servers on electronic devices, completing dynamic information transmission between clients and backend servers, as well as between clients and clients, achieving the effect of entertainment and communication.

Through research, it has been found that in current games, players (also known as "users") may have a plurality of skills configured in their game characters to achieve better combat capabilities by releasing skills during combat. These skills are usually deployed as independent controls in the game interface. However, in most cases, the skills of a character are obtained only after the player's game character reaches the corresponding level or completes the corresponding task, and after obtaining the skill, it needs to be triggered through the corresponding skill control to release the skill, resulting in a relatively single way to obtain and release the skill, which affects the fun of the game.

Based on the above research, the present disclosure provides a skill control method for virtual objects, which can display virtual objects and their corresponding base attack controls and a plurality of skill controls; The a plurality of skill controls correspond to N types of skill attributes, where N is a positive integer greater than or equal to two (2); Then, in response to the trigger operation on the target skill control, determine the target skill attribute corresponding to the target skill control, and generate a target identification corresponding to the target skill attribute in the target area; Then, in response to the different predefined conditions of the target identification corresponding to the skill attributes of N types, the base attack corresponding to the base attack control can be replaced with the target skill corresponding to different predefined conditions. In this way, during the game process, the base attack can be replaced with the target skill by continuously releasing the skill, providing players with different gameplay experiences. In addition, if the skill attributes and number of skills released differ, it can also lead to different target skills after replacement, which can enhance the fun of the game.

The shortcomings of the above solutions are all the results of the inventors' practice and careful study. Therefore, the discovery process of the above problems and the solutions proposed by the present disclosure in the following text should all be the contributions made by the inventor to the present disclosure process.

To facilitate the understanding of the embodiments, a detailed introduction will first be given to the executing entity of the method for skill control of the virtual object provided in the disclosed embodiment. Specifically, as shown in FIG. 1, the executing entity of the method for skill control of the virtual object is electronic device 100, which can include terminal devices and servers. For example, this method is applicable to terminal devices such as smartphones 10, desktop computers 20, laptops 30, etc. shown in FIG. 1, as well as smartwatches, tablets, car devices, VR (Virtual Reality)/AR (Augmented Reality) devices not shown in FIG. 1, without limitation.

This method can also be implemented on server 40 or an implementation environment comprising a terminal and server 40. Server 40 can be an independent physical server, or a server cluster or distributed system composed of a plurality of physical servers, or a cloud server that provides basic cloud computing services such as cloud services, cloud databases, cloud computing, cloud storage, big data, and artificial intelligence platforms.

It should be noted that in some embodiments, server 40 can communicate with smartphone 10, desktop computer 20, and laptop computer 30 through network 50. Network 50 can include various connection types, such as wired, wireless communication links, fiber optic cables, and so on.

Considering cloud games as an example, in the running mode of cloud games, the running subject of the game program and the presenting subject of the game screen are separated. The storage and operation of the game's data processing methods are completed on the cloud game server, and the role of the terminal device is for receiving and sending data, as well as presenting the game screen. During the game, players operate the terminal device to send operation instructions to the cloud game server. The cloud game server runs the game based on the operation instructions, encodes and compresses the game graphics and other data, returns it to the terminal device through the network, and finally decodes and outputs the game graphics through the terminal device.

In an optional implementation, when the game is running on a terminal device, the terminal device is used to interact with the player through a graphical user interface, that is, to download, install, and run the game program through the terminal device. The terminal device can provide a graphical user interface to players in various ways, e.g., by being rendered and displayed on the terminal device's display screen or being provided to the players through holographic projection. By way of example, the terminal device can include a display screen and a processor, which is used to present a graphical user interface, which comprises a game screen, and the processor is used to run the game, generate a graphical user interface, and Control Pictures the display of the graphical user interface on the display screen. That is, the skill control method of the virtual object can be achieved by the processor calling computer-readable instructions stored in the memory.

The following is a detailed explanation of the method for skill control of the virtual object provided in the embodiments of this application, combined with the accompanying drawings. As shown in FIG. 2, the flowchart of a skill control method for a virtual object provided in the present disclosed embodiment comprises the following S101 to S104:

S101, display a virtual object and corresponding base attack controls and a plurality of skill controls; the plurality of skill controls corresponding to skill attributes of N types, where N is a positive integer greater than or equal to two.

As shown in FIG. 3, it is a schematic diagram of the first display interface provided in the present disclosed embodiment. In this embodiment, the display interface is the game screen of the game application. As shown in FIG. 3, the display interface displays virtual object 60, as well as the corresponding base attack control 70 and a plurality of skill controls 80 of virtual object 60. In some embodiments, virtual object 60 may exist in a virtual scene (not shown), referring to a dynamic object that can be controlled in the virtual scene.

Optionally, a virtual scene is a scene used by players to control virtual objects to complete game logic. The virtual scene can be a simulated environment of the real world, a semi simulated and semi fictional virtual environment, or a purely fictional virtual environment. Virtual environments can be sky, land, ocean, etc., where the land comprises environmental elements such as deserts and cities. In addition, virtual scenes can be either two-dimensional (2D) or three-dimensional (3D) virtual scenes. For example, for 2D or 3D multiplayer online battle arena (MOBA) or DNF (Dungeon Fighter) games, virtual scenes are 2D or 3D terrain scenes for virtual objects to engage in battles, such as canyon style mountain ranges Elements such as routes, rivers, dungeons, dungeons, etc.

Optionally, the virtual object 60 may be a virtual character, a virtual animal, an animated character, or the like. This virtual object is a role that users control through input devices. In a possible embodiment, the user can control virtual object 60 to move in the virtual scene, for example, controlling virtual object 60 to run, jump, crawl, etc., and also controlling virtual object 60 to use skills, virtual props, etc. provided by the application to engage in battles with other virtual objects.

Optionally, the base attack control 70 and a plurality of skill controls 80 can be displayed on virtual scenes. Players can use the base attack control 70 to control virtual object 60 to launch attack behavior. By way of example, an attack instruction can be triggered by a trigger operation acting on the base attack control 70, and the virtual object 60 can be controlled to execute the attack operation in the virtual scene according to the attack instruction. The specific attack behavior is related to the type of trigger operation, including, but not limited to, click trigger operation, double click trigger operation, long press trigger operation, and sliding trigger operation. For example, when a player clicks on the base attack control 70, they can control virtual object 60 to launch a single level A attack. When a player long presses on the base attack control 70, they can control virtual object 60 to launch a continuous level A attack. In addition, the display position of the base attack control 70 can be adjusted according to specific needs.

Skills in games can be understood as an operation triggered by virtual objects (characters) in the game to achieve a certain attack power, achieve a specific function, or achieve a specific effect. For example, the skills in the game can be divided into various types, such as attack, defense, and control. Each type of skill can also include a plurality of specific skills, such as boxing, kicking, and other skills; Defense skills can include skills such as blocking and rolling; Control skills can include skills such as immobilization and freezing.

Specifically, when skill control 80 is triggered, virtual object 60 can be controlled to release corresponding skills. It can be understood that different skill controls correspond to different skills, for example, skill 1 controls correspond to frozen skills, skill 2 controls correspond to fixed skills, and skill n controls correspond to skill n.

In some embodiments, a plurality of skill controls 80 can be arranged in a predefined manner, such as being arranged in an arc shape or in a straight line, or in other ways. The present embodiment does not impose specific restrictions on this, as different skill controls may have different display icons, and each skill control may also display corresponding skill descriptions.

It can be understood that each skill has skill attributes, that is, each skill control corresponds to a type of skill attribute skill. Therefore, a plurality of skill controls 80 can correspond to N types of skill attributes, where N is a positive integer greater than or equal to two. It should be noted that a plurality of skill controls 80 correspond to N-class skill attributes, which are actually the skill attributes corresponding to the skill controls. The definition of skill attributes may vary in different games. Optionally, skill attributes can include light attributes or dark attributes; or, alternatively, skill attributes can also include wind attributes, electrical attributes, or lightning attributes. As long as different skills can be divided into different ranges, specific attribute content is not limited herein.

Figure 4:
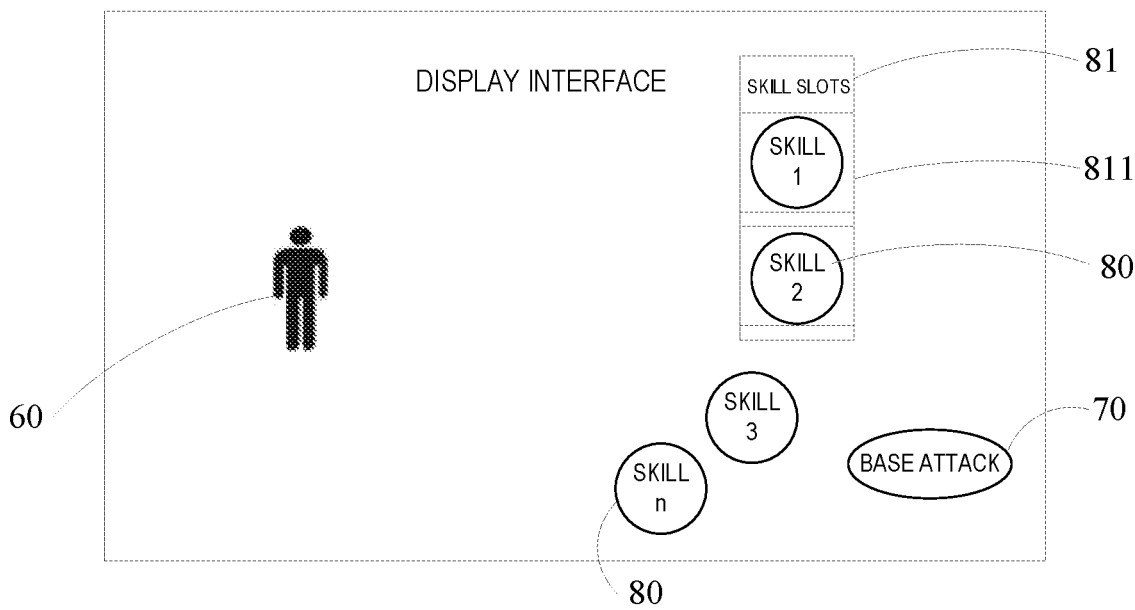
FIG. 4 shows a schematic diagram of the second display interface provided by some embodiments of the present disclosure.

In some embodiments, in order for players to generate a targeted target identification for a certain skill attribute, as shown in FIG. 4, at least one skill slot 81 can be displayed on the display interface, and then at least one skill control 80 corresponding to the same type of skill attribute can be placed in one skill slot 81, so that each skill slot 81 corresponds to at least one skill control 80 with the same target skill attribute. For example, if both the Skill 1 control and Skill 2 control correspond to the X type skill attribute, then the Skill 1 control and Skill 2 control can be placed in Skill Slot 81. In addition, in the presence of a plurality of skill slots 81, skill slots 81 can be grouped, where the skill slots in each group are adjacent and can be used to place the skill controls with the same target skill attribute. In this way, it can facilitate players to distinguish skill controls of different skill attributes of the same type, facilitate the release of skills with the same skill attribute, and improve the cleanliness and aesthetics of the display interface.

It should be noted that each skill slot 81 can comprise a plurality of slots 811, and each slot 811 can correspond to at least one skill control 80. In the case where one slot 811 corresponds to a plurality of skill controls 80, one can be selected from a plurality of skill controls to display, while the other skill controls can be temporarily set as alternatives (such as temporarily hidden in the list). When needed, the skill controls that need to be used can be called up and displayed in the corresponding slots, which can effectively manage a plurality of skill controls while occupying a small display area. For example, Skill 1 and Skill 2 have the same skill attributes and are arranged in the same skill slot 81. Initially, only the Skill 1 control will be displayed and the Skill 2 control will be hidden. After skill 1 is released, during its cooldown time, the skill 1 control can be hidden and the skill 2 control that can be released can be displayed. Furthermore, when displaying the Skill 2 control, the cooldown time of Skill 1 can be displayed at the corresponding position of Skill slot 81 (such as around the Skill 2 control).

S102, in response to a trigger operation for a target skill control, determine a target skill attribute corresponding to the target skill control and generate a target identification corresponding to the target skill attribute in the target area.

If the terminal device is a touch device, the trigger operation includes, but is not limited to, the aforementioned click operation, double click operation, long press operation, and sliding operation; If the terminal device is equipped with a mouse and keyboard, for example, when the terminal device is a desktop computer or laptop computer, the trigger operation can also be input by the player through the mouse or keyboard. The embodiment of this application are not limited in this regard.

Figure 5:
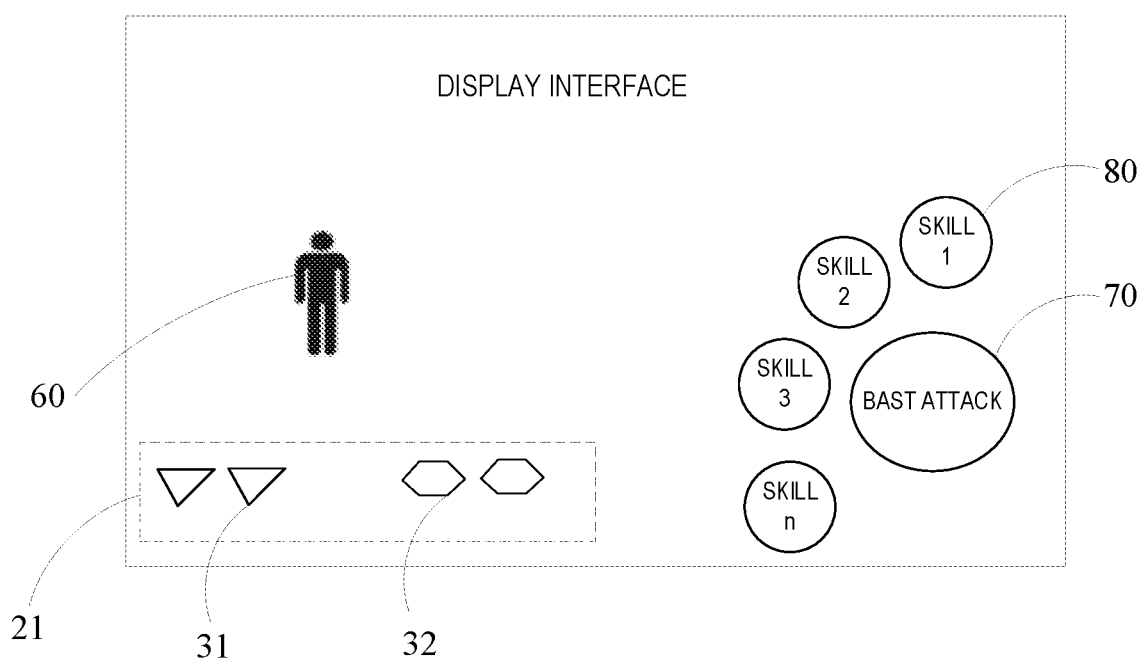
FIG. 5 shows a schematic diagram of a third display interface provided by some embodiments of the present disclosure.

For example, as shown in FIG. 5, the target skill control is one of the aforementioned a plurality of skill controls 80. For example, if Skill 1 control is triggered, Skill 1 control is the target skill control, which can determine the target skill attribute (such as light attribute) corresponding to the skill 1 control in response to the trigger operation on the target skill control (Skill 1 control), and a target identification 31 corresponding to the target skill attribute can be generated in the target area 21; If Skill 3 control is triggered, then Skill 3 control is the target skill control. In response to the trigger operation on the target skill control (Skill 3 control), the target skill attribute (such as dark attribute) corresponding to Skill 3 control can be determined, and a target identification 32 corresponding to the target skill attribute can be generated in the target area 21. That is, different types of skill attributes correspond to different target identifications. The specific number of generated target identifications is unlimited, for example, it can be one or more.

In addition, it should be noted that the process of generating target identifications corresponding to the target skill attributes in the target area can be a process developing from nothing. For example, as shown in FIG. 5, target identifications can be generated in the originally blank area. Alternatively, as shown in FIG. 6, if there were originally basic identifications 311 or 321, target identifications 31 or 32 can be generated by changing the presentation style of the basic identifications (such as turning gray).

Figure 6:
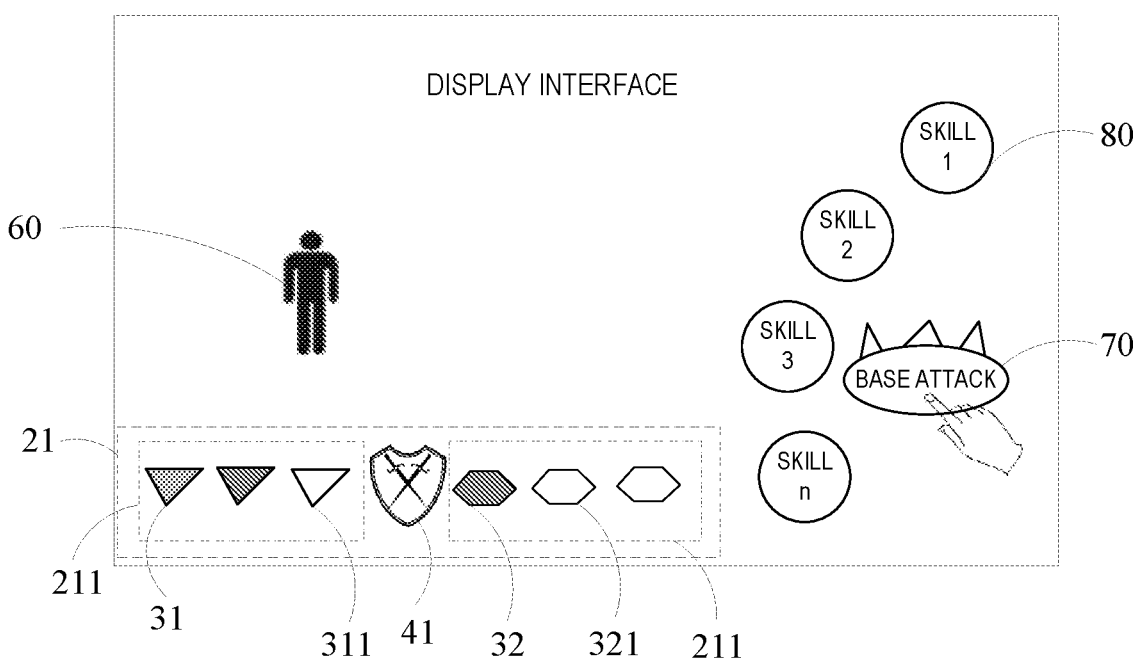
FIG. 6 shows a schematic diagram of the fourth display interface provided by some embodiments of the present disclosure.

In some embodiments, as shown in FIG. 6, the target area 21 comprises a plurality of sub-areas 211, where each skill attribute corresponds to a sub-area 211. For example, the light attribute corresponds to the left sub-area 211, while the dark attribute corresponds to the right sub-area 211. Therefore, it is possible to comprise the following (a) to (b) when, in response to the trigger operation for the target skill control, determining the target skill attribute corresponding to the target skill control and generating a target identification corresponding to the target skill attribute in the target area:

(a) in response to the trigger operation of the target skill control, determining the target skill attribute corresponding to the target skill control and the target sub-area corresponding to the skill attribute;

(b) generating a target identification corresponding to the target skill attribute in the target sub-area.

In the above steps, upon determining the target skill attribute corresponding to the target skill control, the target sub-area corresponding to the skill attribute can be determined. For example, if the target skill attribute is light attribute, the left sub-area 211 can be determined, while if the target skill attribute is dark attribute, the right sub-area 211 can be determined, and then a target identification can be generated in the corresponding sub-area. As such, after the release of skills with the same type of skill attribute, corresponding target identifications can be generated in the same sub-area, which facilitates players to visually distinguish different target identifications through the display area. In addition, it can also improve the aesthetics of the display interface layout.

Figure 7:
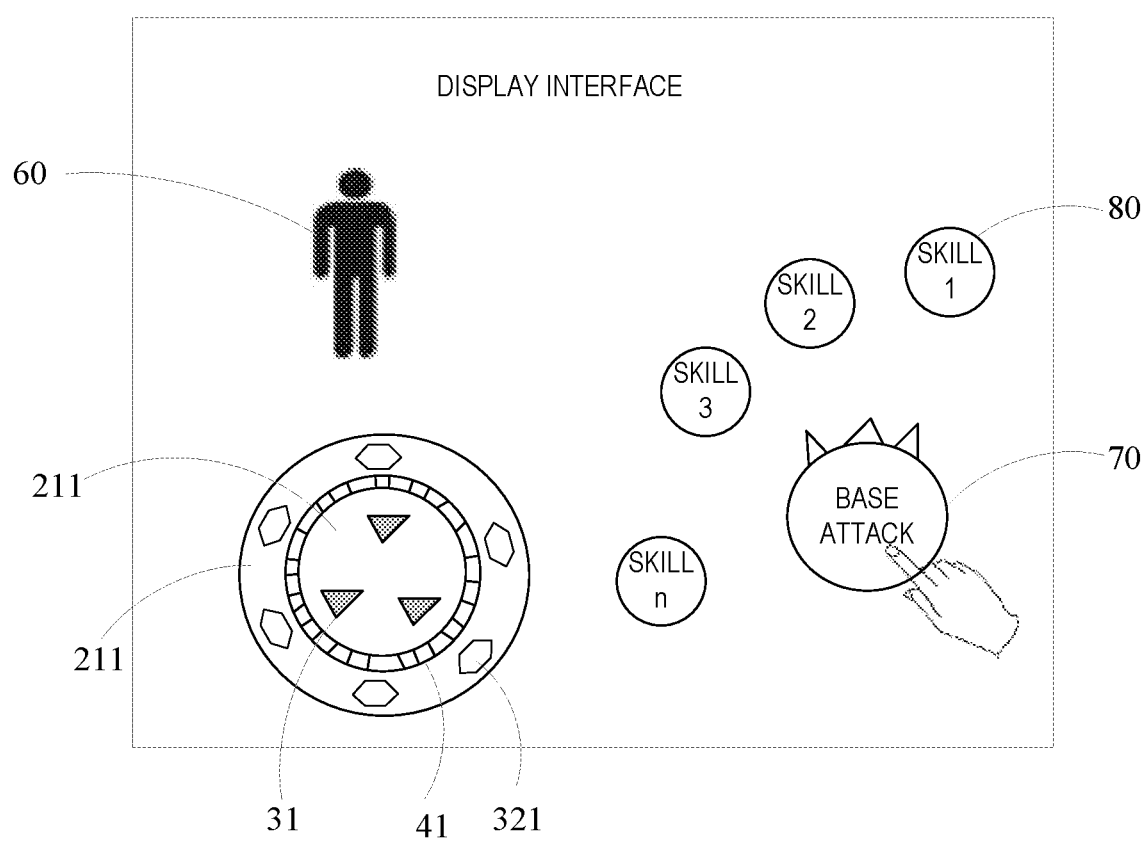
FIG. 7 shows a schematic diagram of the fifth display interface provided by some embodiments of the present disclosure.

Reference is also made to FIGS. 6 and 7. Optionally, there is a predefined position relationship between each sub-area, such as the symmetric relation in FIG. 6 or the ring distribution position relationship in FIG. 7, and adjacent sub-areas 211 can be separated by the target pattern 41, which is not only conducive to players to distinguish the adjacent sub-areas, but also can further improve the display aesthetics.

The content of the target pattern is not limited, such as animal patterns, plant patterns, line markings, geometric shapes, etc., which are not limited herein.

S103, in response to the target identification corresponding to the skill attribute of N types satisfying different predefined conditions, replace the base attack corresponding to the base attack control with the target skill corresponding to different predefined conditions.

The target identification corresponding to the N-type skill attributes satisfying different predefined conditions comprises:

The target identification of each of the skill attributes of N types corresponds to a predefined condition; and/or, combining the target identifications of at least two types of skill attributes in the skill attributes of N types to obtain the combination result, where each combination result corresponds to a predefined condition.

In a specific implementation, different predefined conditions can be set based on the target identification corresponding to different skill attributes for each type of skill attribute. For example, for the target identification of a skill attribute of type X, if the number reaches a predefined number (such as 3), it can be determined that the predefined conditions are met. At this time, the base attack corresponding to the base attack control can be replaced with the target skill 1 (such as group damage increase). For the target identification of a skill attribute of type Y, if the number reaches a predefined number (such as 4), it can be determined that the predefined conditions are met. At this time, the base attack corresponding to the base attack control is replaced with the target skill 2 (such as group regeneration). If the number of target identifications for a skill attribute of type Z reaches a predefined number (such as 5) and the distribution of target identifications is in a predefined shape (such as a circle), it is determined that the predefined conditions are met. At this point, the base attack corresponding to the base attack control is replaced with the target skill 3.

For each combination result corresponding to a predefined condition, the predefined condition corresponding to the combination result can be determined only when the target identification of each type of skill attribute in the combination satisfies the predefined requirements. For example, in the case where the combination comprises target identifications for a skill attribute of type X and a skill attribute of type Y, it is necessary to determine that the predefined conditions are satisfied if both the numbers of target identifications for the skill attribute of type X and the skill attribute of type Y reach a predefined number (such as 3). At this point, the base attack corresponding to the base attack control is replaced with target skill 4.

In embodiments of the present disclosure, the target identification of each skill attribute in the skill attributes of N types can correspond to a predefined condition, or the combination of target identification of at least two from the skill attributes of N types can correspond to a predefined condition. In this way, the predefined conditions can be diversified, and the target skills obtained can be diversified, which is conducive to enhancing the fun of the game.

In some embodiments, for each combination result, the target skill corresponding to the predefined condition corresponding to the combination result comprises the target skill corresponding to the predefined condition corresponding to the target identification of the skill attribute of each type contained in the combination result, as well as the additional skill effect. For example, in the case where the combination contains target identifications for a skill attribute of type X and a skill attribute of type Y, the corresponding target skill of the combination result (such as target skill 4 mentioned above) comprises a target skill corresponding to the skill attributes of type X that meet the predefined condition (such as target skill 1 mentioned above), a target skill corresponding to the skill attributes of type Y that meet the predefined condition (such as target skill 2 mentioned earlier), and an additional skill effect that satisfies a predefined condition. In this way, while achieving the combination of skills, the skill effects can also be displayed externally, which can improve the player's skill release experience while also enhancing their visual experience.

The following is a detailed explanation of the above combination skills using two combinations as examples, combined with FIG. 6. For example, if the target identification 31 corresponding to the skill attribute of type X reaches the predefined number (such as 3), then it is determined that the target identification 31 corresponding to the skill attribute of type X satisfies the predefined conditions, and the corresponding target skill 1 is "group regeneration"; If the target identification 32 corresponding to the skill attribute of type Y reaches the predefined number (such as 3), it is determined that the target identification 32 corresponding to the skill attribute of type Y satisfies the predefined conditions, and the corresponding target skill 2 is "group damage increase". Therefore, if the combination satisfies the predefined conditions, that is, if the target identification 31 corresponding to the skill attribute of type X reaches the predefined number and the target identification 32 corresponding to the skill attribute of type Y reaches the predefined number, then the combination result is determined to meet the predefined conditions, and the corresponding target skill 4 is "group regeneration+group damage+skill effect". Of course, in other embodiments, target skill 4 can also be other skills different from target skill 1 and target skill 2, and there is no limitation here.

Optionally, the different predefined conditions are determined by the number and/or presentation style (such as the shape of the distribution) of the target identifications of the corresponding skill attribute of at least one type. That is to say, the predefined conditions can be determined based on the number of target identifications in skill attributes, the presentation style of target identifications, or a combination thereof. For example, the predefined condition can be that there are up to 3 target identifications, a plurality of target identifications can be distributed in a specific shape (such as triangles, circles, polygons, etc.), or they can be distributed in a specific shape while satisfying a specific quantity. This can diversify the predefined conditions and provide players with a diverse target skill experience.

For example, in order to visually make players feel that the skills corresponding to the base attack control have changed during skill replacement, the display style of the base attack control can be changed while replacing the base attack corresponding to the target skills corresponding to different predefined conditions.

Figure 8:
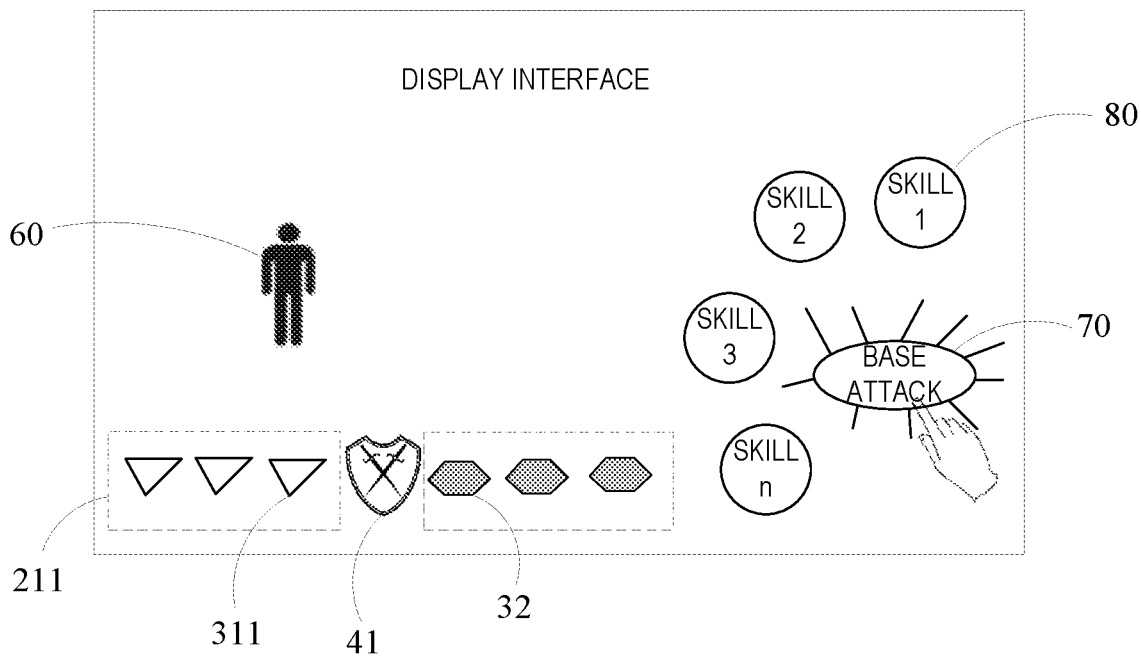
FIG. 8 shows a schematic diagram of a sixth display interface provided by some embodiments of the present disclosure.

Referring to FIGS. 6 and 7 again, if the target identification 31 of the skill attribute of type X reaches the predefined number (2 or 3), it is determined that the target identification of the skill attribute of type X satisfies the predefined conditions, and then the base attack corresponding to the base attack control 70 is replaced with the target skill 1, while changing the presentation style of the attack control 70. As shown in FIG. 8, in some implementations, if the target identification 32 of the skill attribute of type Y reaches a predefined number (3), it is determined that the target identification 32 of the skill attribute of type Y satisfies the predefined conditions, and then the base attack corresponding to the base attack control 70 is replaced with the target skill 2, while changing the presentation style of the attack control 70. The presentation styles corresponding to different predefined conditions can be the same or different, as shown in FIGS. 7 and 8. The presentation styles are different, so that players can intuitively determine the target skill corresponding to the current attack control 70 through the presentation style of the attack control 70, which is beneficial for improving the player's gaming experience.

S104: in response to a trigger operation for the base attack control, control the virtual object to release the target skill.

For example, after replacing the base attack corresponding to the base attack control 70 with the target skill, if the base attack control 70 is triggered, the virtual object 60 can be controlled to release the target skill.

In some embodiments, after controlling the virtual object 60 to release the target skill, the target area corresponding to the target skill is also restored to an initial state. For example, referring to FIG. 8, after the target skill is released, the target identification 32 in sub-area 211 can be restored to the state of the base identification 321 (not colored in FIG. 6). This represents the end of a target skill cycle, which is conducive to the next generation of target identifications. This can then achieve a continuous cycle of generating and releasing target skills during the game, which is beneficial for improving the player's gaming experience.

Those skilled in the art can understand that in the specific implementation methods mentioned above, the writing order of each step does not imply a strict execution order and imposes any restrictions on the implementation process. The specific execution order of each step should be determined based on its function and possible internal logic.

Based on the same technical concept, the disclosed embodiment also provides a skill control device for the virtual object corresponding to the skill control method of the virtual object. Since the principle of solving the problem in the disclosed embodiment is similar to the skill control method of the virtual object mentioned in the disclosed embodiment, the implementation of the device can be referred to in the implementation of the method, and any repetition will not be repeated.

Figure 9:
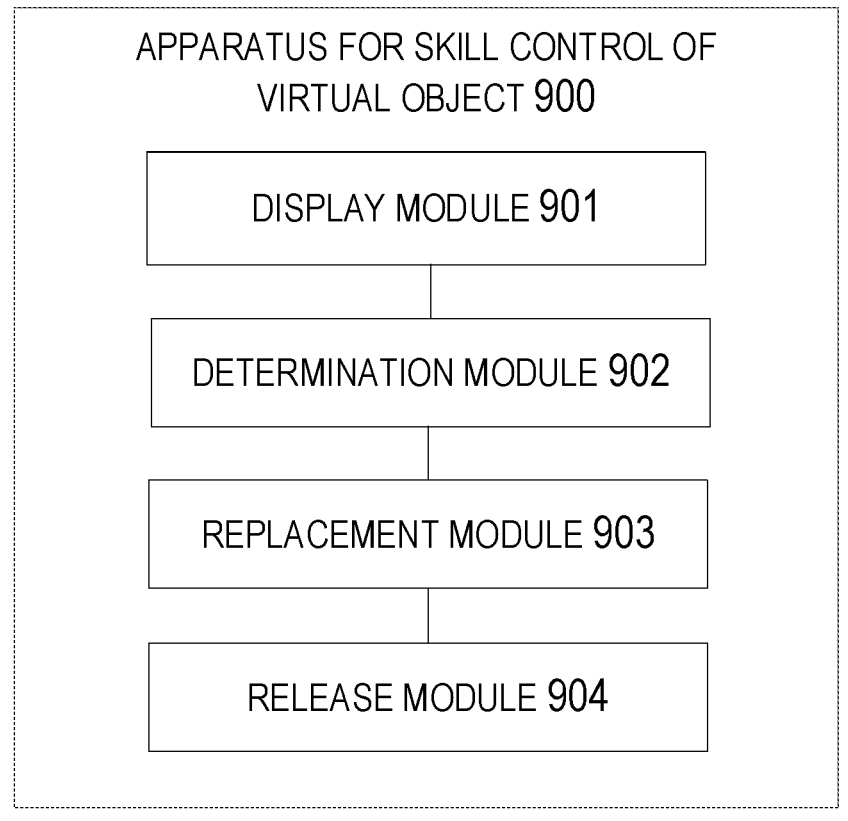
FIG. 9 shows a schematic diagram of the structure of the skill control device of the virtual object provided in some embodiments of the present disclosure.

FIG. 9 shows a schematic diagram of an apparatus 900 for skill control of a virtual object as provided in the present disclosed embodiment, the apparatus 900 comprising:

Display module 901 for displaying a virtual object and corresponding base attack controls and a plurality of skill controls; the plurality of skill controls corresponding to skill attributes of N types, where N is a positive integer greater than or equal to two;

Determination module 902 for, in response to a trigger operation for a target skill control, determining a target skill attribute corresponding to the target skill control and generating a target identification corresponding to the target skill attribute in the target area;

Replacement module 903 for, in response to the target identification corresponding to the skill attribute of N types satisfying different predefined conditions, replacing the base attack corresponding to the base attack control with the target skill corresponding to different predefined conditions; and Release module 904 for, in response to a trigger operation for the base attack control, controlling the virtual object to release the target skill.

In a possible embodiment, the display module 901 is further used for:

displaying at least one skill slot, each skill slot corresponding to at least one skill control with a same target skill attribute.

In a possible embodiment, the replacement module 903 is specifically for:

replacing the base attack corresponding to the base attack control with the target skill corresponding to different predefined conditions, and changing a display style of the base attack control.

In a possible embodiment, the target identification corresponding to the N-type skill attribute satisfies different predefined conditions, comprising:

a target identification of each of the skill attributes of N types corresponding to a predefined condition; and/or, combining the target identifications of at least two of the skill attributes of N types to obtain combination results; wherein each of the combination results corresponds to a predefined condition.

In a possible embodiment, for each combination result, the target skills corresponding to the predefined condition corresponding to the combination result comprises the target skill corresponding to the predefined condition corresponding to the target identification of each type of skill attribute contained in the combination result, and an additional skill effect.

In a possible embodiment, the different predefined conditions are determined by the number and/or presentation style of the target identifications the corresponding skill attribute at least one type.

In a possible embodiment, the target area comprises a plurality of sub-areas, with each skill attribute corresponding to a sub-area; the determination module 902 is specifically used for:

in response to the trigger operation for the target skill control, determining the target skill attribute corresponding to the target skill control and the target sub-area corresponding to the skill attribute;

generating a target identification corresponding to the target skill attribute in the target sub-area.

In a possible embodiment, the respective sub-areas have predetermined positional relationship, and adjacent sub-areas are separated by a target pattern.

In a possible embodiment, the display module 901 is further for:

upon releasing the target skill, restoring the target area corresponding to the target skill to an initial state.

The description of the processing flow of each module in the device, as well as the interaction flow between each module, can refer to the relevant instructions in the above method embodiments, and will not be detailed here.

Figure 10:
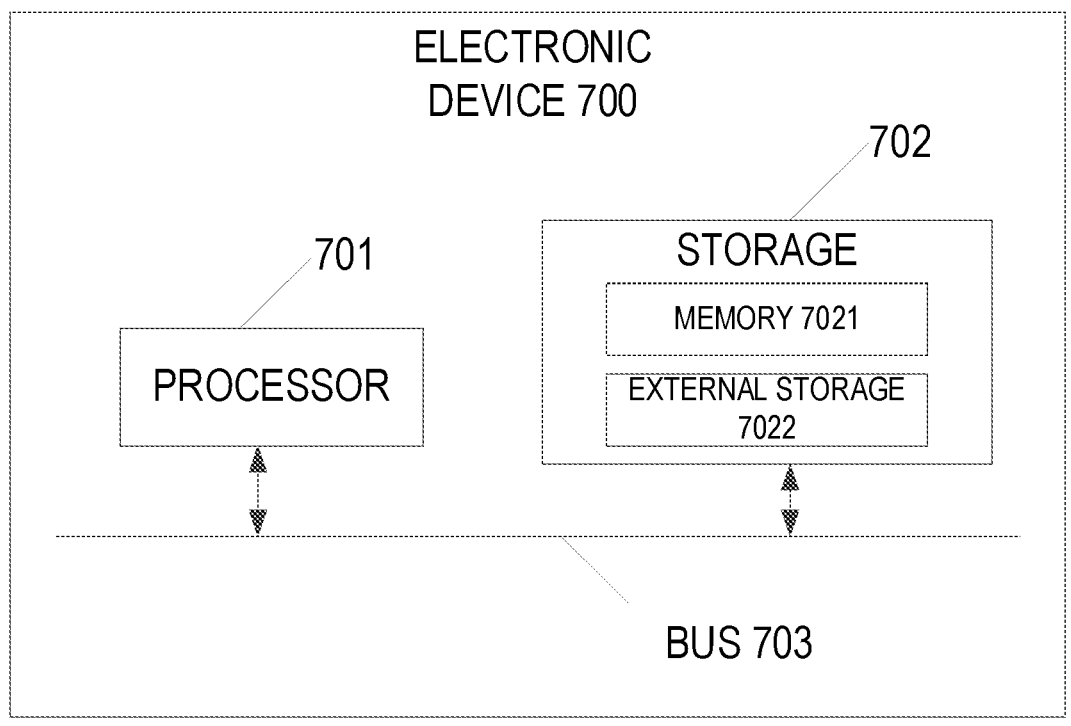
FIG. 10 illustrates schematic diagrams of electronic devices provided in some embodiments of the present disclosure.

Based on the same technical concept, the disclosed embodiment also provides an electronic device. Referring to FIG. 10, a schematic diagram of the structure of the electronic device 700 provided in the present disclosed embodiment comprises a processor 701, a storage 702, and a bus 703. Storage 702 is used to store execution instructions, comprising memory 7021 and external storage 7022; The memory 7021 here is also called internal memory, which is used to temporarily store the calculation data in the processor 701 and the data exchanged with the external storage 7022 such as the hard disk. The processor 701 exchanges data with the external storage 7022 through the storage 7021.

In the embodiment of the present application, the storage 702 is specifically used to store the application program code executing the present application scheme, and is controlled by the processor 701 for execution. That is, when the electronic device 700 is running, the processor 701 communicates with the storage 702 through bus 703, causing the processor 701 to execute the application program code stored in the storage 702, thereby executing the method described in any of the aforementioned embodiments.

The storage 702 can be, but is not limited to, Random-access memory (RAM), Read Only Memory (ROM), Programmable Read Only Memory (PROM), Erasable Programmable Read Only Memory (EPROM), Electric Erasable Programmable Read Only Memory (EEPROM), etc.

Processor 701 may be an integrated circuit chip with signal processing capabilities. The above processors can be general-purpose processors, comprising Central Processing Unit (CPU), Network Processor (NP), etc; It can also be a Digital Signal Processor (DSP), Application Specific Integrated Circuit (ASIC), Field Programmable Gate Array (FPGA) or other programmable logic devices, discrete gate or transistor logic devices, or discrete hardware components. The disclosed methods, steps, and logical block diagrams in the embodiments of the present invention can be implemented or executed. A general-purpose processor can be a microprocessor or any conventional processor.

It can be understood that the structure illustrated in the embodiments of this application does not constitute a specific limitation on electronic device 700. In other embodiments of this application, electronic device 700 may include more or fewer components than shown, or combine certain components, or split certain components, or arrange different components. The illustrated components can be implemented in hardware, software, or a combination of software and hardware.

The present disclosed embodiment also provides a computer readable storage medium on which a computer program is stored. The computer program is executed by the processor during the execution of the skill control method of the virtual object in the above method embodiment. Among them, the storage medium can be a volatile or non volatile computer readable storage medium.

The present disclosed embodiment also provides a computer program product that carries program code, which comprises instructions that can be used to execute the skill control method steps of the virtual object in the above method embodiment. For details, please refer to the above method embodiments and will not be repeated here.

Among them, the above-mentioned computer program products can be specifically implemented through hardware, software, or a combination of them. In one optional embodiment, the computer program product is specifically embodied as a computer storage medium, while in another optional embodiment, the computer program product is specifically embodied as a software product, such as a Software Development Kit (SDK), etc.

Those skilled in the art can clearly understand that for the convenience and conciseness of the description, the specific working process of the system and device described above can refer to the corresponding processes in the aforementioned method embodiments, and will not be repeated here. In the several embodiments provided in this disclosure, it should be understood that the disclosed systems, devices, and methods can be implemented in other ways. The device embodiments described above are only schematic. For example, the division of the units is only a logical functional division, and there may be other division methods in actual implementation. For example, a plurality of units or components can be combined or integrated into another system, or some features can be ignored or not executed. On the other hand, the coupling or direct coupling or communication connection displayed or discussed between each other can be indirect coupling or communication connection through some communication interfaces, devices or units, which can be in the form of electrical, mechanical or other forms.

The units described as separate components can be or may not be physically separated, and the components displayed as units can be or may not be physical units, that is, they can be located in one place or distributed across a plurality of network units. Some or all of the units can be selected according to actual needs to achieve the purpose of this embodiment.

In addition, in various embodiments of the present disclosure, each functional unit can be integrated into a single processing unit, each unit can physically exist separately, or two or more units can be integrated into one unit.

If the function is implemented in the form of a software functional unit and sold or used as an independent product, it can be stored in a non volatile computer readable storage medium that can be executed by a processor. Based on this understanding, the disclosed technical solution, in essence, or the portion that contributes to the existing technology or the portion of the technical solution, can be reflected in the form of a software product, which is stored in a storage medium, Comprising several instructions to enable a computer device (which can be a personal computer, server, or network device, etc.) to perform all or part of the steps of the methods described in various embodiments of the present disclosure. The aforementioned storage media include: U disk, Portable storage device, read-only memory, Random-access memory, disk or optical disk and other media that can store Stored procedure code.

Finally, it should be noted that the above embodiments are only specific embodiments of the present disclosure, intended to illustrate the technical solution disclosed, rather than limiting it. The scope of protection of the present disclosure is not limited to this. Although detailed explanations of the present disclosure have been provided by referring to the aforementioned embodiments, regular technical personnel in the art should understand that any person familiar with the technical field within the scope of the disclosed technology, It can still modify the technical solution recorded in the aforementioned embodiments or easily think of changes, or equivalently replace some of the technical features; And these modifications, changes, or substitutions do not separate the essence of the corresponding technical solution from the spirit and scope of the disclosed embodiment technical solution, and should be covered within the scope of protection of this disclosure. Therefore, the scope of protection disclosed in this disclosure shall be based on the scope of protection claimed.

The invention claimed is:

1. A method for skill control of a virtual object comprising:

displaying a virtual object and corresponding base attack controls and a plurality of skill controls; the plurality of skill controls corresponding to skill attributes of N types, where N is a positive integer greater than or equal to two;

in response to a trigger operation for a target skill control, determining a target skill attribute corresponding to the target skill control and generating a target identification corresponding to the target skill attribute in a target area;

in response to the target identification corresponding to the skill attribute of N types satisfying different predefined conditions, replacing the base attack corresponding to the base attack control with the target skill corresponding to different predefined conditions, and changing a display style of the base attack control; and in response to a trigger operation for the base attack control, controlling the virtual object to release the target skill.

2. The method according to claim 1, wherein the target identification corresponding to the skill attribute of N types satisfying different predefined conditions comprises at least one of:

a target identification of each of the skill attributes of N types corresponding to a predefined condition; or, combining the target identifications of at least two of the skill attributes of N types to obtain combination results; wherein each of the combination results corresponds to a predefined condition.

3. The method according to claim 2, wherein, for each of the combination results, the target skill corresponding to the predefined condition corresponding to the combination result comprises: the target skill corresponding to the predefined condition corresponding to the target identification of each type of the skill attribute contained in the combination result, and an additional skill effect.

4. The method according to claim 1, wherein the different predefined conditions are determined by at least one of the number or presentation style of the target identifications of the corresponding skill attribute of at least one type.

5. The method according to claim 1, wherein the target area comprises a plurality of sub-areas, and wherein in response to a trigger operation for a target skill control, determining a target skill attribute corresponding to the target skill control and generating a target identification corresponding to the target skill attribute in the target area comprises:

in response to the trigger operation for the target skill control, determining the target skill attribute corresponding to the target skill control and the target sub-area corresponding to the skill attribute; and generating a target identification corresponding to the target skill attribute in the target sub-area.

6. The method according to claim 5, wherein the respective sub-areas have predetermined positional relationship, and adjacent sub-areas are separated by a target pattern.

7. The method according to claim 1, wherein upon releasing the target skill, the method further comprises:

restoring the target area corresponding to the target skill to an initial state.

8. The method according to claim 1, further comprising:

displaying at least one skill slot, each skill slot corresponding to at least one skill control with a same target skill attribute.

9. An electronic device comprising a processor, a memory and a bus, the memory storing machine-readable instructions which are executable by the processor, when the electronic device operating, the processor communicating with the memory through the bus, and the machine-readable instructions, when executed by the processor, carrying out acts comprising:

displaying a virtual object and corresponding base attack controls and a plurality of skill controls; the plurality of skill controls corresponding to skill attributes of N types, where N is a positive integer greater than or equal to two;

in response to a trigger operation for a target skill control, determining a target skill attribute corresponding to the target skill control and generating a target identification corresponding to the target skill attribute in a target area;

in response to the target identification corresponding to the skill attribute of N types satisfying different predefined conditions, replacing the base attack corresponding to the base attack control with the target skill corresponding to different predefined conditions, and changing a display style of the base attack control; and in response to a trigger operation for the base attack control, controlling the virtual object to release the target skill.

10. A non-transitory computer-readable storage medium storing a computer program thereon, the computer program, when executed by a processor, carrying out acts comprising:

displaying a virtual object and corresponding base attack controls and a plurality of skill controls; the plurality of skill controls corresponding to skill attributes of N types, where N is a positive integer greater than or equal to two;

in response to a trigger operation for a target skill control, determining a target skill attribute corresponding to the target skill control and generating a target identification corresponding to the target skill attribute in a target area;

in response to the target identification corresponding to the skill attribute of N types satisfying different predefined conditions, replacing the base attack corresponding to the base attack control with the target skill corresponding to different predefined conditions, and changing a display style of the base attack control; and in response to a trigger operation for the base attack control, controlling the virtual object to release the target skill.

* * * * *